March 1, 1927.　　　O. G. FRITCH ET AL　　　1,619,791
GREENHOUSE PLANT SUSPENSION FRAME
Filed June 26, 1926
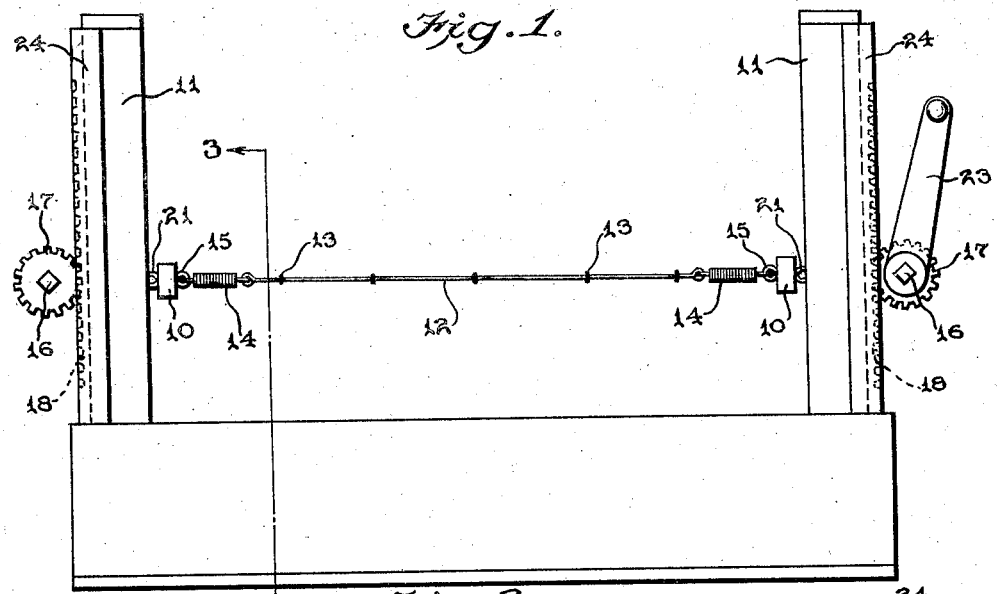
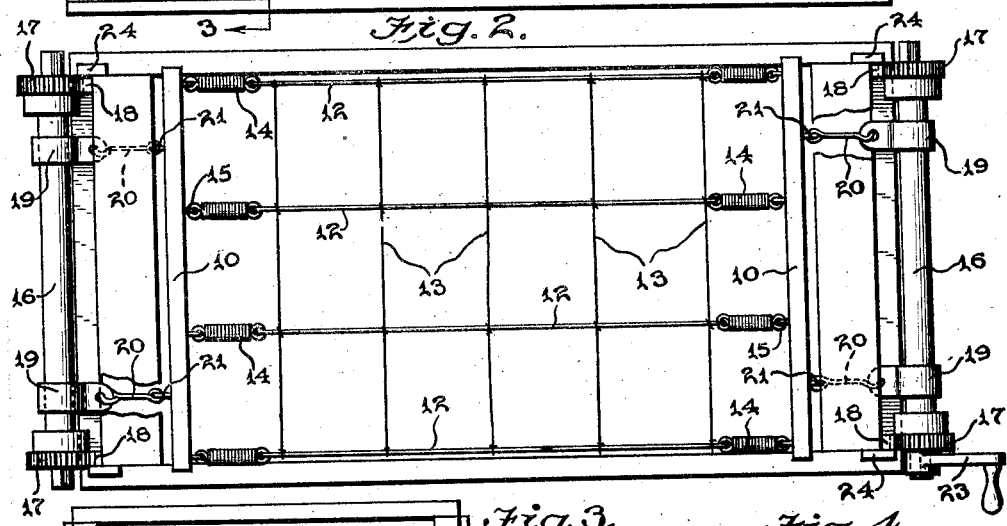
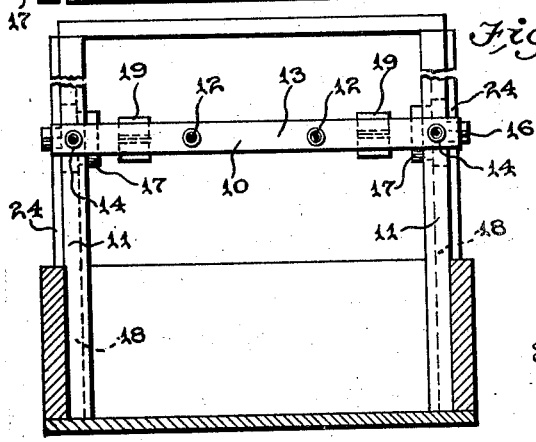
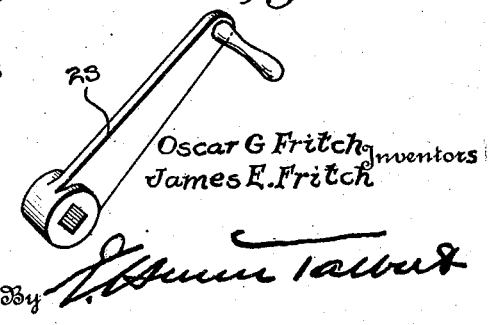
Oscar G Fritch, Inventors
James E. Fritch
By　　　　　　　Attorney Patented Mar. 1, 1927.

1,619,791

UNITED STATES PATENT OFFICE.

OSCAR G. FRITCH AND JAMES E. FRITCH, OF ASHLAND, NEBRASKA.

GREENHOUSE PLANT-SUSPENSION FRAME.

Application filed June 26, 1926. Serial No. 118,696.

The object of the invention is to provide a device particularly adapted for use in greenhouses as a means for supporting the longitudinal and transverse wires usually strung up to support the stems of plants during growth; to provide a construction wherein the wires and their supporting means may constitute a permanent part of the greenhouse equipment adapted to be raised as the plants grow and to be elevated to the top of the structure so as to be out of the way when its use is not necessary; and to provide a construction wherein the wires are continually subjected to tension by means of springs, so that the structure as a whole may be disposed in a diagonal plane without undue tension on the wires and without the necessity of having to employ some means to create a tension on the wires after the same have been disposed in a horizontal plane after having been used disposed at a diagonal plane.

With this object in view, the invention consists in a construction and combination of parts of which a preferred embodiment is illustrated in the accompanying drawings, wherein:

Figure 1 is a side elevational view of the invention.

Figure 2 is a top plan view.

Figure 3 is an enlarged sectional view on the plane indicated by the line 3—3 of Figure 1.

Figure 4 is a perspective view of the operating crank.

The wire frame, which is mounted for vertical adjustment, consists of the cross-heads 10 disposed at opposite ends of the greenhouse structure and on the inside of supporting uprights 11, the cross-heads being connected by the longitudinal wires 12 spanned by the transverse wires 13 bound to the longitudinal wires where they cross and connect with the latter. The connections between the longitudinal wires and the cross-heads consist of springs 14 terminally secured to the longitudinal wires and to eyes 15 mounted in the cross-heads. The springs, therefore, apply tension to the longitudinal wires and at the same time tend to keep the cross-heads out of contact with the uprights 11.

The adjusting means consist of transverse shafts 16 terminally provided with pinions 17, the latter meshing with racks 18 mounted on the outside faces of the uprights 11. Connection between the shafts 16 and the cross-heads is made by means of collars 19 loosely surrounding the shafts adjacent the pinions 17 and connected to the cross-heads by means of tension rods 20 which are connected with the collars and with eyes 21 on the cross-heads. The shafts 16 at their opposite ends are provided with squared or angular extremities 22 for the application of a turning crank 23.

The springs 14 which tension the wires also function to keep the pinions in engagement with the racks, since there is a lateral pull on the shafts 16 in the direction of the racks due to the connections between the shafts and the cross-heads, and longitudinal movement of the shafts is precluded by means of guard plates 24 mounted on the uprights adjacent the racks so as to abut the teeth on the pinions. Obviously, adjustment of either end of the frame vertically is possible by the application of the turning crank to the squared end of the shaft 16 and rotating the latter and by the proper operation of the shafts at the two ends, the frame may be disposed diagonally at any desired height or arranged in a horizontal plane and lowered or elevated as desired.

The invention having been described, what is claimed as new and useful is:

1. A plant supporting frame comprising opposed cross-heads spanned by connecting wires and provided with tensioning springs connecting them with said wires, and means for elevating and lowering said cross-heads independently.

2. A plant supporting frame comprising opposed cross-heads spanned by connecting wires and provided with tensioning springs connecting them with said wires, and means for elevating and lowering said cross-heads independently, said means being held in operative position by the tension of said springs.

3. A plant supporting frame consisting of opposed cross-heads spanned by longitudinal wires and provided with tension springs connecting them with said wires, upright racks, and shafts paralleling the cross-heads and connected therewith and provided with pinions engaging said racks, the shafts being disposed on the opposite sides of the racks from the cross-heads.

4. A plant supporting frame comprising vertical supports, cross-heads disposed in spanning relation each to a pair of supports, the pairs of supports being oppositely disposed, racks mounted on the supports opposite the cross-heads, wires spanning the cross-heads and connected to the latter by tension springs, shafts disposed in spanning relation to the supports and provided with pinions engaging the racks, and connections between the shafts and the cross-heads.

5. A plant supporting frame comprising vertical supports, cross-heads disposed in spanning relation each to a pair of supports, the pairs of supports being oppositely disposed, racks mounted on the supports opposite the cross-heads, wires spanning the cross-heads and connected to the latter by tension springs, shafts disposed in spanning relation to the supports and provided with pinions engaging the racks, collars loosely surrounding said shafts, and tension members connecting the collars with the cross-heads.

In testimony whereof they affix their signatures.

OSCAR G. FRITCH.
JAMES E. FRITCH.